United States Patent
Chapman

(10) Patent No.: US 9,009,602 B2
(45) Date of Patent: *Apr. 14, 2015

(54) ASSISTED BROWSER NAVIGATION

(75) Inventor: Richard A. Chapman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 13/463,010

(22) Filed: May 3, 2012

(65) Prior Publication Data

US 2012/0221631 A1 Aug. 30, 2012

Related U.S. Application Data

(63) Continuation of application No. 10/751,616, filed on Jan. 5, 2004, now Pat. No. 8,214,745.

(51) Int. Cl.
- G06F 3/00 (2006.01)
- G06F 15/16 (2006.01)
- G06F 17/30 (2006.01)

(52) U.S. Cl.
CPC ...... G06F 17/30873 (2013.01); G06F 2216/15 (2013.01)

(58) Field of Classification Search
CPC .......... G06F 2216/15; G06F 17/30876; G06F 9/4446
USPC ............................ 715/709, 751; 709/205, 248
See application file for complete search history.

(56) References Cited

U.S. PATENT DOCUMENTS

| | | | |
|---|---|---|---|
| 5,596,721 A | 1/1997 | Masse et al. | |
| 5,799,191 A | 8/1998 | Moriyasu et al. | |
| 5,884,032 A | 3/1999 | Bateman et al. | |
| 5,954,798 A | 9/1999 | Shelton et al. | |
| 6,212,192 B1 | 4/2001 | Mirashrafi et al. | |
| 6,295,551 B1 | 9/2001 | Roberts et al. | |
| 6,983,307 B2 | 1/2006 | Mumick et al. | |
| 7,051,119 B2 | 5/2006 | Shafron et al. | |
| 7,062,465 B1 | 6/2006 | Shafiee et al. | |
| 7,120,897 B2 | 10/2006 | Ebbo et al. | |
| 2002/0035603 A1 | 3/2002 | Lee et al. | |
| 2002/0065912 A1 | 5/2002 | Catchpole et al. | |
| 2002/0073152 A1 | 6/2002 | Andrew et al. | |
| 2002/0143878 A1* | 10/2002 | Birnbaum et al. | ............ 709/205 |
| 2002/0167539 A1* | 11/2002 | Brown et al. | ................. 345/705 |
| 2002/0186255 A1 | 12/2002 | Shafron et al. | |

(Continued)

OTHER PUBLICATIONS

Office Action (Mail Date Oct. 15, 2008) for U.S. Appl. No. 10/751,616, filed Jan. 5, 2004.

(Continued)

*Primary Examiner* — Nicholas Ulrich

(74) *Attorney, Agent, or Firm* — Schmeiser, Olsen & Watts, LLP; John R. Pivnichny

(57) ABSTRACT

Assisting navigation of a first browser executing on a first data processing system is provided by navigating, responsive to a second browser executing on a second data processing system, to identify information to be displayed using the first browser on the first data processing system. An identifier is request to associate with the identified information and the identifier is dynamically generated responsive to the request for an identifier. The identifier is associated with the identified information to be displayed using the first browser such that the identified information may be retrieved using the identifier.

20 Claims, 7 Drawing Sheets

(56) References Cited

U.S. PATENT DOCUMENTS

| | | |
|---|---|---|
| 2002/0198941 A1 | 12/2002 | Gavrilescu et al. |
| 2003/0043190 A1 | 3/2003 | Bernius et al. |
| 2003/0140113 A1 | 7/2003 | Balasuriya |
| 2004/0083292 A1 | 4/2004 | Lueckhoff et al. |
| 2005/0149616 A1 | 7/2005 | Chapman |
| 2006/0259553 A1 | 11/2006 | Kawakita |

OTHER PUBLICATIONS

Amendment filed May 7, 2008 in response to Office Action (Mail Date Oct. 15, 2008) for U.S. Appl. No. 10/751,616, filed Jan. 5, 2004.

Final Office Action (Mail Date Aug. 1, 2008) for U.S. Appl. No. 10/751,616, filed Jan. 5, 2004.

Amendment after Final filed Oct. 1, 2008 in response to Final Office Action (Mail Date Aug. 1, 2008) for U.S. Appl. No. 10/751,616, filed Jan. 5, 2004.

Advisory Action (Mail Date Nov. 4, 2008) for U.S. Appl. No. 10/751,616, filed Jan. 5, 2004.

Notice of Appeal filed Dec. 1, 2008 in response to Advisory Action (Mail Date Nov. 4, 2008) for U.S. Appl. No. 10/751,616, filed Jan. 5, 2004.

Appeal Brief filed Dec. 4, 2008 for U.S. Appl. No. 10/751,616, filed Jan. 5, 2004.

Examiner's Answer to Appeal Brief (Mail Date Feb. 23, 2009) for U.S. Appl. No. 10/751,616, filed Jan. 5, 2004.

Reply Brief filed Mar. 20, 2009 for U.S. Appl. No. 10/751,616, filed Jan. 5, 2004.

BPAI Decision—Examiner Reversed (Mail Date Feb. 9, 2012) for U.S. Appl. No. 10/751,616, filed Jan. 5, 2004.

Notice of Allowance (Mail Date Feb. 21, 2012) for U.S. Appl. No. 10/751,616, filed Jan. 5, 2004.

\* cited by examiner

_US 9,009,602 B2_

ASSISTED BROWSER NAVIGATION

This application is a continuation application claiming priority to Ser. No. 10/751,616, filed Jan. 5, 2004, now U.S. Pat. No. 8,214,745, issued Jul. 3, 2012.

FIELD OF THE INVENTION

The present invention relates generally to data processing systems, the operation and/or the use of data processing systems and more particularly to the operation and/or the use of data processing systems executing a browser.

BACKGROUND OF THE INVENTION

As use of the Internet and/or other networks has increased, so has the complexity of navigating through information and/or other networks using a web browser. For example, in some e-commerce applications, a user may navigate through multiple web pages, fill out multiple forms and/or answer multiple questions in order to navigate to information of interest to the user. One such example may be the configuration of a computer for purchase by the user. In order for the user to determine the price of the computer, the user may need to answer questions or otherwise select options as part of the configuration of the computer. For example, the user may need to configure the memory, storage requirements, connectivity features, warranty packages and/or other accessories for use with the computer. Such configuration may involve answering multiple questions and/or filling out multiple forms before the price of the configured computer is provided to the browser of the user. Furthermore, the navigation path, e.g., the answers to specific questions provided to the user, may determine what information is next provided to a user and, therefore, may be controlling in whether the user ultimately is provided the information that they desire.

Furthermore, as the amount of information available through web pages, for example, on the Internet or on an Intranet or Extranet, has increased, the ability to locate specific items of interest to a user may have become more difficult. Thus, for example, in locating an item a user may have to navigate through multiple pages. In fact, it is possible that the only mechanism provided for accessing the information may be through the navigation of the pages such that the information may not be directly accessible to the user by, for example, directly entering a Universal Resource Locater (URL) into the user's web browser.

In conventional systems, when a user establishes a session with a server through a web browser, the server may establish a context for that session of the web browser. The context may contain information about the web browser session. For example, the context may contain security information, often referred to as the security context of the session. The context may also contain other information, such as the navigation path or history of the web browser's interaction with the server. Thus, the context may specify what information is to be provided to the browser. For example, the context may contain the answers to questions provided by the user through the web browser or other selection made by the user through the web browser. Thus, changes in the browser's context at a server may change the information provided to the browser.

One difficulty that may arise as a result of the complexity of locating information on the Internet, extranets and/or intranets relates to helping user's locate information that they have, typically, failed to find on their own. In such cases, a user may, for example, call a help desk or sales consultant for assistance in locating the information. Typically, the consultant tries to replicate the step-by-step navigation that the user would have to go through to locate the information using the consultant's browser and then relays this information to the user, for example, over the telephone or through e-mail. However, such an approach may be error prone and/or time consuming. The approach may be error prone in that the user, typically, must duplicate the steps provided by the consultant exactly or the desired information will not be located. The approach may be time consuming because, if the user makes a mistake, the process may have to be started over from the beginning. Also, the consultant may need to wait for the user at each step to assure that the user has correctly entered the information provided by the consultant before moving to the next step.

For example, in an online shopping environment, consumers may have difficulty finding specific goods or services at an Internet website. The consumer may contact a merchant sales consultant by phone to receive assistance finding the goods or services on the website as an initial step in placing an order. The sales consultant, typically, provides the consumer with a series of search instructions that eventually lead to the web page providing the information. This may be time consuming and frustrating for the consumer, which can have a negative impact on sales.

Alternatively, sharing of screen images over the Internet could be used to provide the information to the consumer. However, this generally only presents a screen snapshot as opposed to navigating the user to the web page containing the information, where the web page may have additional navigating capabilities. Alternatively, remote control of the consumer system by the sales consultant could also be provided, however, router/firewalls and other security measures may limit such a solution.

SUMMARY OF THE INVENTION

Embodiments of the present invention provide for assisting navigation of a first browser executing on a first data processing system, by navigating, responsive to a second browser executing on a second data processing system, to identify information to be displayed using the first browser on the first data processing system. An identifier to associate with the identified information is requested and the identifier is dynamically generated responsive to the request for an identifier. The identifier is associated with the identified information to be displayed using the first browser such that the identified information may be retrieved using the identifier.

In further embodiments of the present invention, the identifier is provided to the first browser and the information is accessed with the first browser using the dynamically generated identifier. Additionally, navigating to identify information may be provided by establishing a browser context of a session of the second browser. The established context is established by navigating to the identified information using the second browser. The identifier may be associated with the identified information by associating the identifier with at least a portion of the browser context sufficient to access the identified information. Accessing the information with the first browser using the dynamically generated identifier may include locating the portion of the browser context utilizing the identifier and incorporating the located portion of the browser context in a browser context of a session of the first browser so as to provide the information to the first browser.

Associating the identifier with a portion of the browser context sufficient to access the identified information may include copying the browser context and associating the copy of the browser context with the dynamically generated identifier. Associating the identifier with a portion of the browser context sufficient to access the identified information could also include extracting context information from the browser context and associating the extracted information of the browser context with the dynamically generated identifier.

In particular embodiments of the present invention, the identified information includes a web page.

In certain embodiments of the present invention, the dynamically generated identifier is associated with the identified information for a predefined time period. The dynamically generated identifier may be associated with the identified information until the identifier is used to access the identified information. The dynamically generated identifier may also be associated with the identified information for a duration of a session of the first browser.

In further embodiments of the present invention, a system for assisted browser navigation includes an identifier repository configured to store identifiers and an association with information retrievable by a browser and further includes a navigation assist circuit. The navigation assist circuit is configured to receive a request for an identifier from a first browser, dynamically generate an identifier in response to the received request, associate the identifier with information to be retrieved and store the identifier and association in the repository. The navigation assist circuit is further configured to receive an identifier from a second browser and use the received identifier to provide the information associated with the received identifier to a browser.

In additional embodiments of the present invention, the navigation assist circuit is further configured to extract context information from a first browser context of a session of the first browser and associate the extracted context information with the dynamically generated identifier. The navigation assist circuit may also be configured to store the extracted context information in the identifier repository. The navigation assist circuit may be further configured to incorporate the extracted context information in a second browser context associated with the second browser, responsive to receiving the dynamically generated identifier from the second browser. The extracted context information may be a copy of the first browser context. The information to be retrieved may include a web page.

In additional embodiments of the present invention, the navigation assist circuit is configured to associate the dynamically generated identifier with the information to be retrieved for a predefined time period. The navigation assist circuit may also be configured to associate the dynamically generated identifier with the information to be retrieved until the identifier is used to retrieve the information. The navigation assist circuit may be configured to associate the dynamically generated identifier with the information to be retrieved for a duration of a session of the second browser.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
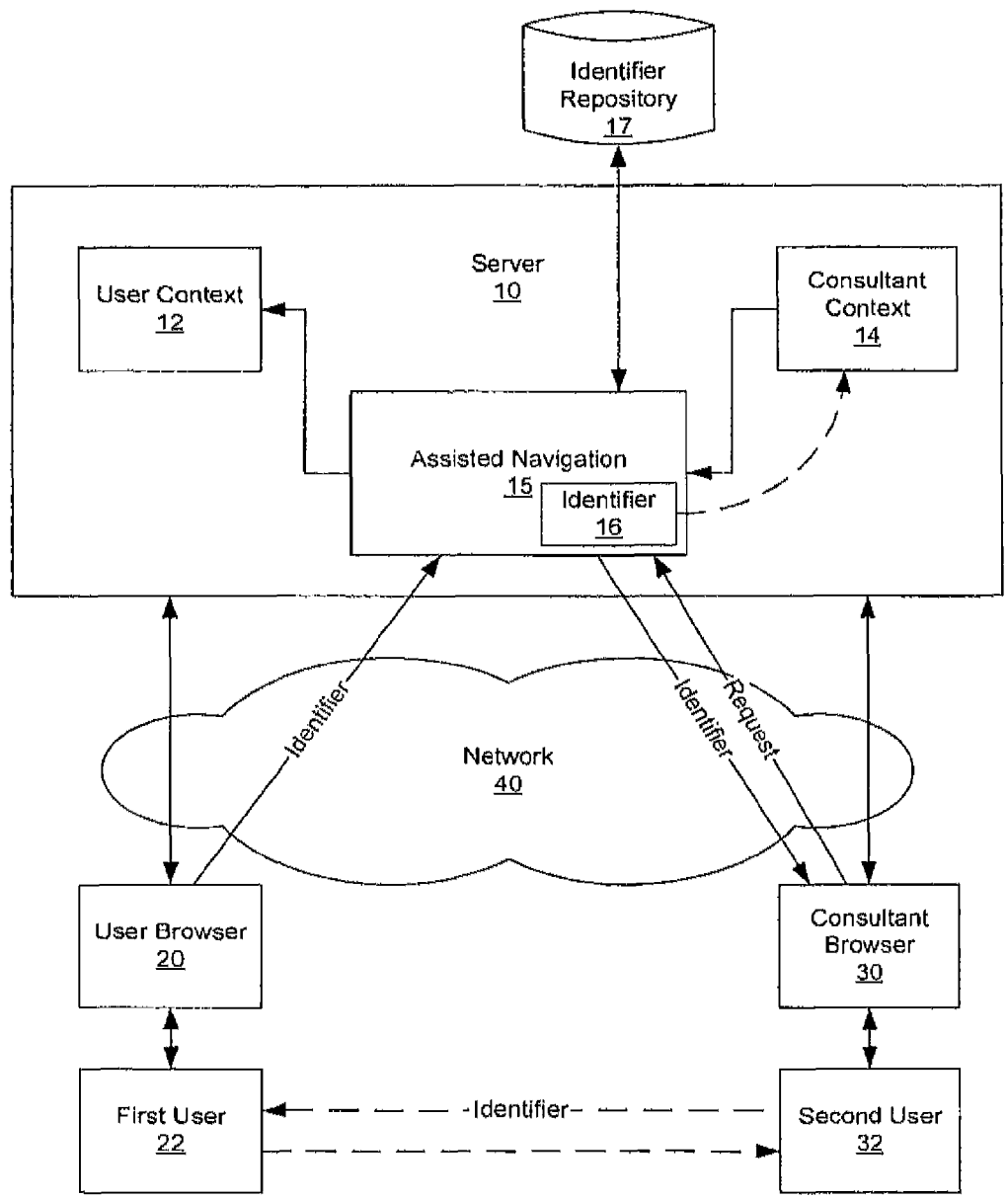
FIG. 1 is a block diagram of a system according to some embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for assisted navigation of a web browser executing on a first data processing system. Particular embodiments of the present invention provide for use of a dynamically generated identifier that identifies information, for example, a web page, to be provided to a first browser, such that providing the identifier to a server results in the information being provided to the first browser. The association of the identifier with the information to be provided to the first browser may be created as a result of use of a second browser on a second data processing system. Thus, for example, a consultant, help desk personnel and/or other user (collectively and individually referred to herein as a "consultant") may locate information for a user, generate an identifier that is associated with the information and provide the identifier to the user. The user may then enter the identifier to access the information without having to go through the location process carried out by the consultant.

Various embodiments of the present invention will now be described with reference to the figures. FIG. 1 illustrates a system according to embodiments of the present invention. As seen in FIG. 1, a server 10 may include an assisted navigation circuit/module 15 and may communicate with a user browser 20 executing on a first data processing system and a consultant browser 30 executing on a second data processing system through, for example, a network 40. The network 40 may be any suitable network including, for example, the Internet, an extranet and/or an intranet. While the browser 20 and the browser 30 are referred to herein as a user browser and a consultant browser, such terms are used solely to differentiate between a first browser and a second browser and, therefore, should not be construed as limiting embodiments of the present invention.

The user browser 20 and/or the consultant browser 30 may be any suitable web browser, for example, those provided by AOL-Time Warner and Microsoft Corporation and may be a stand-alone application or may be embedded in another application, such as in a document management application, financial application, word processing, spreadsheet, database or other application capable of carrying out functions other than accessing web pages over a network. Thus, as used herein, the term browser refers to a program capable of retrieving and displaying information from a server over a network and may include conventional web browsers or other applications having web browser functionality.

In communicating with the server 10, a user context 12 is created that reflects the context of a session of the user browser 20 with the server 10. Likewise, in communicating with the server 10, a consultant context 14 is created that reflects the context of a session of the consultant browser 30 with the server 10.

A first user 22 of the user browser 20 and a second user 32 of the consultant browser 30 may also communicate, for example, over a telephone or using e-mail. This communication is reflected by the dashed lines in FIG. 1 between the first user 22 and the second user 32. Such communications may, for example, allow the first user 22 to identify to the second user 32 information that the first user 22 is unable to locate. The second user 32 may then navigate to the desired information using the consultant browser 30. Thus, after the navigation to the desired information, the consultant context 14 would reflect this navigation. The second user 32 requests an identifier 16 from the assisted navigation circuit/module 15 using the consultant browser 30 and the identifier 16 is generated and associated with at least a portion of the information in the consultant context 14. The associated portion of the information in the consultant context 14 may allow for access to the desired information and may, for example, reflect the navigation by the second user 32 to the desired information. The entire consultant context 14 could also be copied and associated with the identifier 16 by the assisted navigation circuit/module 15.

The consultant context information in the consultant context 14 may be associated with the identifier 16, for example, by maintaining a table of identifiers and associated context information, by creating a database of identifiers and context information or by other techniques known to those of skill in the art for storing and relating information. Thus, for example, the identifier 16 and the association with context information from the consultant context 14 could be stored in an identifier repository 17. The identifier 16 and the associated context information could be stored directly in the identifier repository 17 and/or the identifier repository 17 could store a pointer to the associated context information.

Furthermore, the identifier 16 may be generated by receiving the identifier 16 from the consultant browser 30, for example, by receiving input from the second user 32 so as to specify the identifier, by generating an arbitrary sequence of text, such as a string of numbers and/or letters, by selecting an identifier from a list of currently unused identifiers or by any technique suitable for determining a unique identifier for use in assisted navigation. As used herein, a unique identifier is an identifier that is only associated with a single assisted navigation session for a user and may include the re-use of previously used identifiers. Thus, for example, the identifier "ABCD" may be initially associated with a first set of context information and then subsequently re-assigned to a second, different set of context information. The identifier "ABCD," however, would still be considered unique as there is a one-to-one relationship between the identifier and a set of context information.

An assisted navigation session refers to a period of time when the identifier 16 is associated with a particular set of context information. The time period may be static and/or dynamic. For example, an identifier 16 may be associated with a particular set of context information for a predefined time after the association is established, such as ten minutes. After such time period, the identifier 16 may be invalidated so that the identifier 16 may no longer be used to access the particular set of context information, for example, by removing the identifier from the identifier repository 17 or marking a corresponding entry in the identifier repository 17 as invalid. The identifier 16 could be associated with a particular set of context information until the identifier 16 is used to access the context information. The identifier 16 could also be invalidated if a maximum number of valid identifiers had been reached. In such a case, the oldest identifier could be invalidated so that it could be re-used. Thus, for example, the identifier repository 17 may maintain information regarding the identifier 16, such as when it was created, so as to allow for management of identifiers and information stored in the identifier repository 17. Combinations of a predefined time, the use of the identifier 16 to access context information and/or an oldest identifier re-use could also be provided.

The identifier 16 could also be associated with a particular browser session of the user browser 20 such that as long as that browser session is active, the identifier 16 is associated with the particular set of context information. Multiple identifiers could be associated with a single browser session. In such a case, the consultant browser 30 may provide information so as to identify the session of the user browser 20, such as by providing information to identify the user context 12 such that the identifier 16 may also be associated with the user context 12. Thus, when the user context 12 is no longer valid, for example, by a user terminating a session with the server 10, such as by logging out of a website, the identifier 16 may be made available for re-use.

The identifier associated with information from the consultant context 14 is provided to the consultant browser 30. The second user 32 communicates the identifier 16 to the first user 22 and the first user 22 may enter the identifier into the user browser 20. The user browser 20 provides the identifier to the assisted navigation circuit/module 15, for example, by entering the identifier 16 into a data entry field of a web page. The assisted navigation circuit/module 15 retrieves the corresponding information from the identifier repository 17, accesses the context information associated with the identifier 16 and incorporates the context information into the user context 12 to provide an updated user context. The updated user context results in the information of interest to the first user 22 being provided to the user browser 20, for example, to be displayed to the first user 22.

In certain embodiments of the present invention, sufficient information from the consultant context 14 is incorporated into the user context 12 to allow the user browser 20 to access the located information. In particular embodiments, only sufficient information is incorporated into the user context 12. Thus, for example, the security context portion of the consultant context 14 need not be incorporated into the user context 12 unless such information is necessary to access the located information. Also, if the first data processing system and the second data processing system have different characteristics, such as display resolution, browser plug-ins, connection types or the like that may be incorporated in the respective user context 12 and consultant context 14, then such information need not be transferred from the consultant context 14 to the user context 12. In such a way, the consultant browser 30 may have differing information that may allow the second user 32 different access rights and/or other characteristics without the need to incorporate such rights and/or characteristics into the user context. Furthermore, as discussed above, in certain embodiments of the present invention, only the information needed to access the located information need be associated with the identifier and/or stored by the assisted navigation circuit/module 15.

While embodiments of the present invention are illustrated with the respect to a particular division of functions in FIG. 1, other configurations may also be utilized while still benefiting from the teachings of the present invention. For example, the assisted navigation circuit/module 15 could be provided by a separate server from the server 10 that has access to the consultant context 14 and the user context 12. The identifier repository 17 could be incorporated in the server 10 or provided on a separate data processing system. Furthermore, the consultant browser 30 may access a different server from the server 10 and, therefore, the consultant context 14 may be provided by a different server. Accordingly, embodiments of the present invention should not be construed as limited to the particular configuration and/or architecture illustrated in FIG. 1 but may include other configurations and/or architectures capable of carrying out the operations described herein.

Additionally, while embodiments of the present invention are described herein with reference to utilizing browser contexts to provide information located by a second user to a first user, other techniques for transferring such information may also be utilized. Accordingly, certain embodiments of the present invention should not be construed as limited to the use of context and the transfer of information from one context to another.

Figure 2:
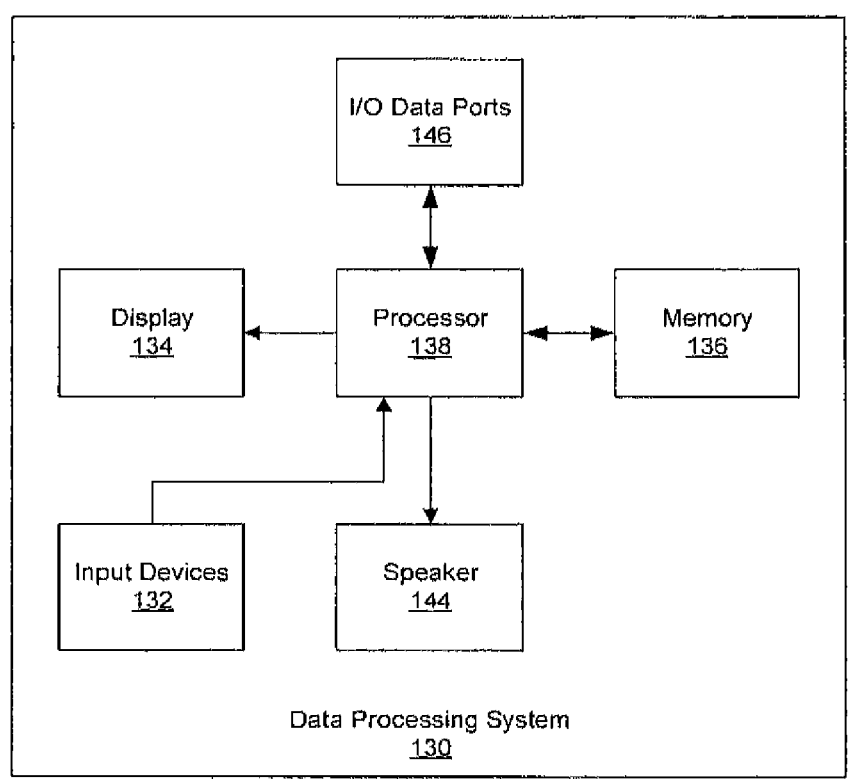
FIG. 2 is a block diagram of a data processing system suitable for use in embodiments of the present invention.

FIG. 2 illustrates an exemplary embodiment of a data processing system 130 suitable for use as a first data processing system, a second data processing system and/or a server in accordance with embodiments of the present invention. The data processing system 130 typically includes input device(s) 132 such as a keyboard, pointer, mouse and/or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 3:
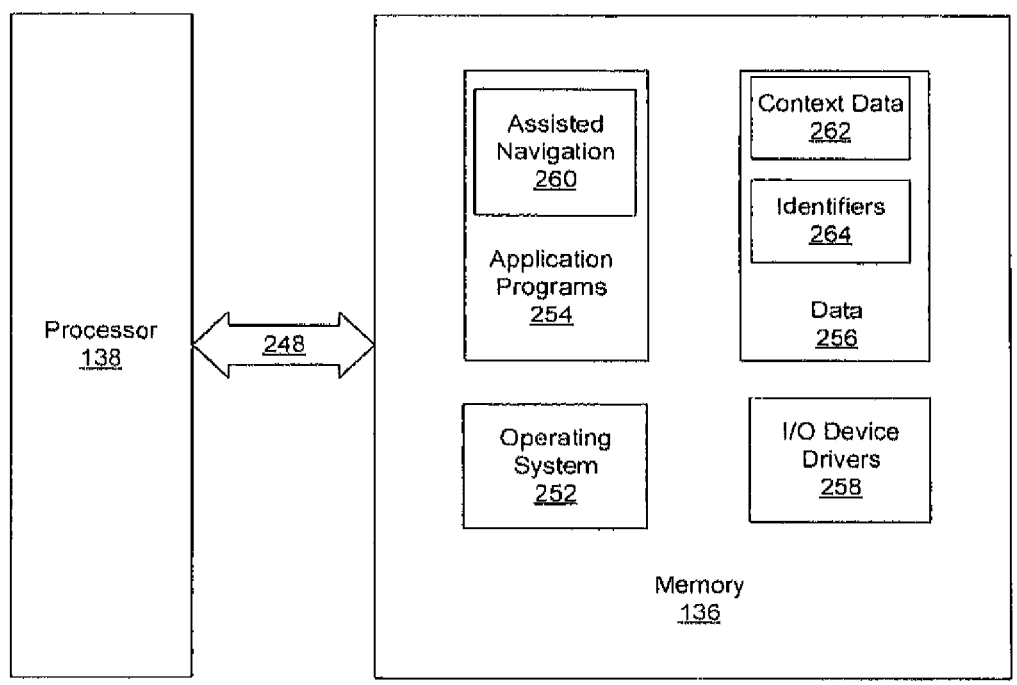
FIG. 3 is a more detailed block diagram of aspects of a data processing system that may be used in embodiments of the present invention.

FIG. 3 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices, and may contain the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 3, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX, System390 or z/OS from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 3, the application programs 254 may include an assisted navigation module 260. The assisted navigation module 260 may carry out the operations described herein for accessing information utilizing data, such as the context data 262 and the identifiers 264. While the present invention is illustrated, for example, with reference to the assisted navigation module 260 being an application program in FIG. 3, as will be appreciated by those of skill in the art, other configurations may also be utilized. For example, the assisted navigation module 260 may also be incorporated into the operating system 252, the I/O device drivers 258 or other such logical division of the data processing system 130. Thus, the present invention should not be construed as limited to the configuration of FIG. 3 but encompasses any configuration capable of carrying out the operations described herein.

Figure 4:
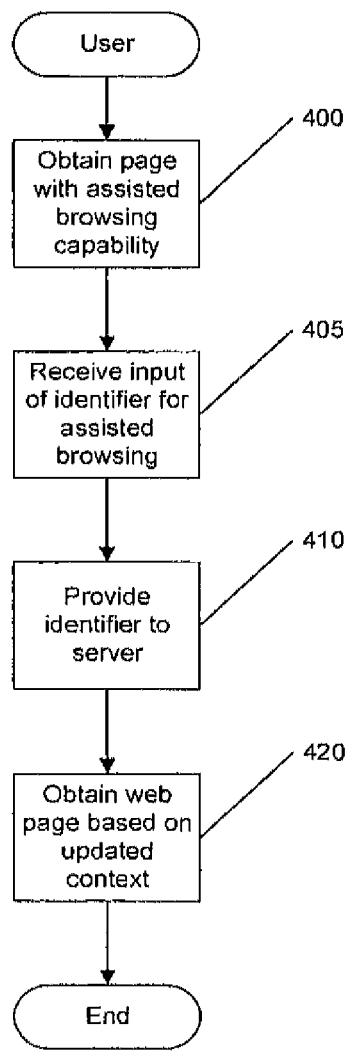
FIG. 4 is flow chart illustrating operations of a first browser executing on a first data processing system according to embodiments of the present invention.

FIG. 4 is a flowchart illustrating operations carried out by a browser of a first user according to certain embodiments of the present invention. Such operations are carried out utilizing an identifier that may be generated as described below with reference to FIGS. 5 through 7. As seen in FIG. 4, a browser, such as the browser 20 of a user, obtains a web page that includes an assisted navigation and/or browsing capability (block 400). The user inputs an identifier for assisted navigation/browsing to the browser (block 405). The browser provides the identifier to a server having the assisted navigation capability (block 410), for example, to the assisted navigation circuit/module 15, and the web page associated with the identifier is obtained based on an updated context of the browser (block 420).

The assisted navigation capability may, for example, be provided as a data input field where the data provided to the data input field is sent from the browser to an assisted navigation circuit/module of a server. For example, an assisted navigation field may be provided as part of a help page where information for contacting support or customer service representatives is provided. The assisted navigation field could also be provided as part of a frame for web pages or using other web page design techniques known to those of skill in the art.

Furthermore, the assisted navigation circuit/module may support multiple information providers on multiple servers. For example, the assisted navigation circuit/module could provide a search assistance interface supporting access to information from different content providers. Thus, a user could use a common assistance interface when contacting different providers for assistance in locating information. For example, a shopping portal could provide access to goods from different retail web sites but provide a common interface for locating particular goods irrespective of which site provided the information about the goods. A consumer could contact a representative of the individual web sites that would provide an identifier that would be entered into the common interface to navigate to the desired information.

Figure 5:
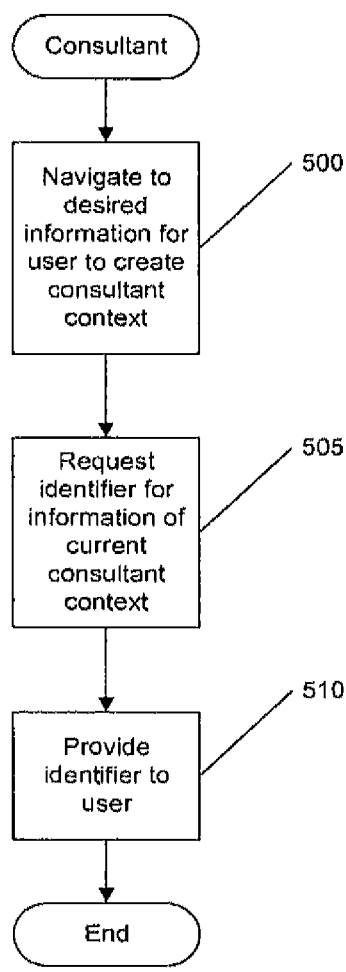
FIG. 5 is flow chart illustrating operations of a second browser executing on a second data processing system according to embodiments of the present invention.

FIG. 5 is a flowchart illustrating operations carried out by a second user or consultant and/or a browser of the consultant according to certain embodiments of the present invention. Such operations are carried out to create context information that is associated with an identifier that may be generated as described below with reference to FIGS. 6 through 7. As seen in FIG. 5, a browser, such as the browser 30 of a consultant, navigates to the information desired by the first user to create consultant context information (block 500). When the information is located, the consultant requests an identifier, for example, from the navigation assist circuit/module 15, that is to be associated with information that allows the first user to retrieve the information (block 505). Thus, the identifier is dynamically associated with the information that the first user is to retrieve. As used herein, the term "dynamically associated" refers to the association being established at the time the information is needed rather than in a static manner, such as provided, for example, by a Universal Resource Locater (URL). The consultant provides the identifier to the first user so that the first user may use the identifier to retrieve the information (block 510). The identifier may be provided to the first user using any suitable communications mechanism, including, for example, over the telephone, using e-mail, conventional mail, paging messages, or other communications techniques.

Figure 6:
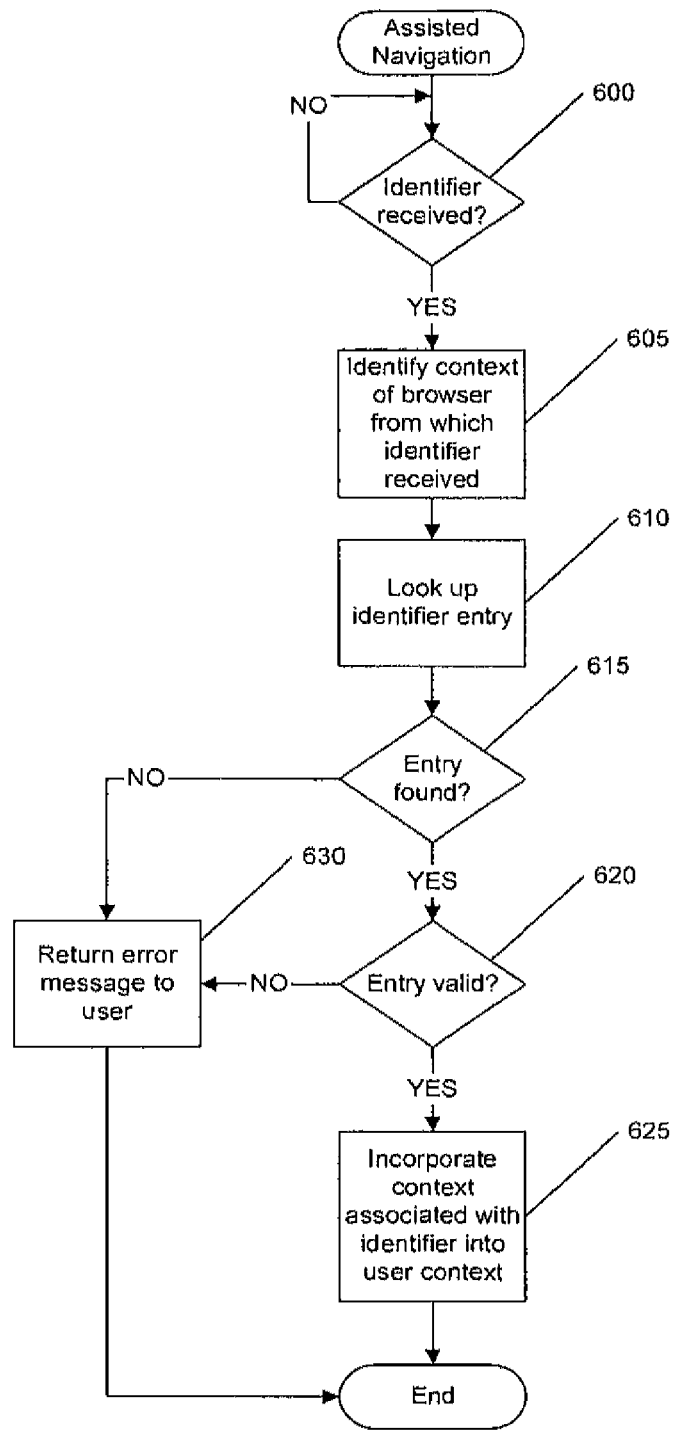
FIG. 6 is flow chart illustrating operations of an assisted navigation circuit/module according to embodiments of the present invention.

FIG. 6 is a flowchart illustrating operations of an assisted navigation module/circuit, such as the assisted navigation circuit/module 15 of FIG. 1, according to certain embodiments of the present invention. As seen in FIG. 6, the assisted navigation circuit/module waits to receive an identifier from a browser (block 600). When an identifier is received (block 600), the assisted navigation circuit/module identifies the context of the browser from which the identifier is received (block 605). The assisted navigation circuit/module also performs a look up using the identifier (block 610). The look up may be of a table and/or database or other structure in which identifiers are stored.

If an entry corresponding to the identifier is found (block 615), it is determined if the entry is valid (block 620). Such a determination may be made, for example, based on time, a validity flag or other indicator or the determination may be made based on the existence of an entry corresponding to the identifier such that if an entry is found, the identifier is valid. In such a case, the identifiers would be removed from the table and/or database once they were no longer valid. Techniques for determining if an identifier is valid may include those discussed above with reference to FIG. 1.

If the entry is valid (block 620), the context information associated with the identifier is incorporated into the context of the browser from which the identifier was received (block 625). If no entry is found (block 615) or if the entry is not valid (block 620), an error message may be returned to the user (block 630).

Figure 7:
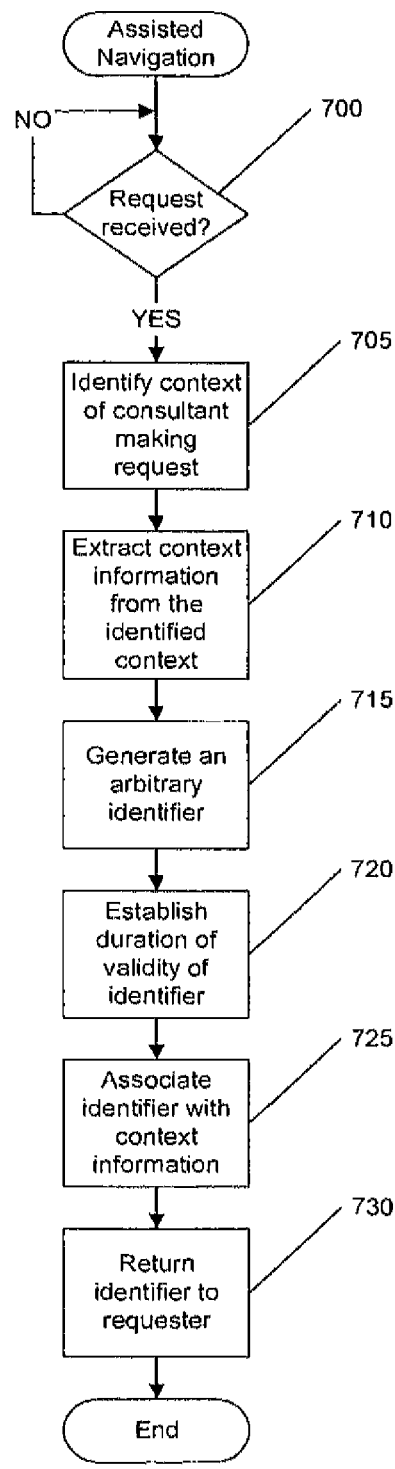
FIG. 7 is flow chart illustrating further operations of an assisted navigation circuit/module according to embodiments of the present invention.

FIG. 7 is a flowchart illustrating operations of an assisted navigation circuit/module according to certain embodiments of the present invention. As seen in FIG. 7, the assisted navigation circuit/module waits for a request for an identifier (block 700). When a request for an identifier is received (block 700), the assisted navigation circuit/module identifies a context of a browser from which the request was received (block 705). Context information is extracted from the identified context (block 710). An arbitrary identifier is generated (block 715) and, if desired, a duration of the validity of the identifier may be established (block 720). As discussed above, the duration of the validity of an identifier may be established such that the identifier is valid for a particular time period, while a particular session is active, until it is used or based on other criteria. The identifier is also associated with the extracted context information (block 725). The identifier is returned to the requester (block 730).

In addition to the operations described above, the assisted navigation circuit/module may also perform operations for maintenance of the identifier information. For example, out of date entries in the identifier repository 17 could periodically be purged. Variations of the operations illustrated in FIGS. 4 through 7 may also be provided in certain embodiments of the present invention. For example, when an identifier is generated, such as in block 715 of FIG. 7, if all possible identifiers are currently represented by entries in the identifier repository 17, an oldest entry could be re-used and associated with new context information. Also, as discussed above, the identifier could be obtained from the requester. Thus, embodiments of the present invention should not be construed as limited to the operations illustrated in FIGS. 4 through 7.

The flowchart and block diagrams of FIGS. 1 through 7 illustrate the architecture, functionality, and operations of some embodiments of methods, systems, and computer program products for assisted navigation. In this regard, each block represents a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of assisted browser navigation, said method comprising:
    a server creating a user context that reflects a context of a first session between a user browser and the server, said user context being within the server;
    said server creating a consultant context that reflects a context of a second session between a consultant browser and the server, said consultant context being within the server, said user browser and said consultant browser being different browsers, said first session and said second session being different sessions;
    a first user at the user browser identifying, to a second user at the consultant browser by communication via telephone or email from the first user to the second user, information that the first user is unable to locate and desires to obtain;
    responsive to the second user having navigated to the desired information in response to the first user having identified the desired information to the second user, said server receiving from the consultant browser context information identifying an access to the desired information;
    said server storing the received context information in the consultant context;
    after said server storing the received context information in the consultant context, said server receiving from the user browser an identifier of the context information stored in the consultant context, said identifier having been established at a time when the desired information is needed rather than having been established statically;
    said server using the received identifier to identify the context information stored in the consultant context; and
    said server storing the identified context information in the user context, wherein the server is configured to transmit the context information in the user context to the user browser for enabling the user to access, via the user browser, the desired information.

2. The method of claim 1, wherein said server using the received identifier comprises:
    said server matching the received identifier to an identifier stored in a repository coupled to the server such that the received identifier and the stored identifier are a same identifier, wherein the repository stores an association relating to the identifier and associating the identifier with the context information; and
    said server using the stored association to identify the context information stored in the consultant context.

3. The method of claim 2, wherein the association associates the identifier with the context information by comprising a pointer to the context information.

4. The method of claim 2, said method comprising:
    after said server storing the received context information in the consultant context, said server receiving from the consultant browser a request for the identifier;
    said server generating the identifier in response to the received request;
    after said server generating the identifier, said server generating the association;
    after said server generating the association, said server storing the identifier and the association in the repository and providing the identifier to the consultant browser;
    after said server providing the identifier to the consultant browser, said consultant browser providing the identifier to the second user;
    after said consultant browser providing the identifier to the second user, said second user providing the identifier to the first user via telephone or email from the second user to the first user;
    after said second user providing the identifier to the first user, said user browser receiving the identifier from the first user prior to said server receiving the identifier from the user browser.

5. The method of claim 1, wherein the identifier is not a Universal Resource Locator (URL).

6. A method of assisted browser navigation, said method comprising:
    a server creating a user context that reflects a context of a first session between a user browser and the server, said user context being within the server;
    said server creating a consultant context that reflects a context of a second session between a consultant browser and the server, said consultant context being within the server, said user browser and said consultant browser being different browsers, said first session and said second session being different sessions;
    said server storing context information in the consultant context after the context information was received by the server from the consultant browser after a first user at the user browser identified, to a second user at the consultant browser, information that the first user desires to obtain and after the first user has requested that the second user assist the first user in obtaining access to the desired information and after the second user navigated to the desired information using the consultant browser, said context information identifying an access to the desired information;
    after said server storing the received context information in the consultant context, said server receiving from the user browser an identifier of the context information stored in the consultant context, said identifier having been established at a time when the desired information is needed rather than having been established statically;
    said server using the received identifier to identify the context information stored in the consultant context; and
    said server storing the identified context information in the user context, wherein the server is configured to transmit the context information in the user context to the user browser for enabling the user to access, via the user browser, the desired information.

7. The method of claim 6, wherein said server using the received identifier comprises:
  said server matching the received identifier to an identifier stored in a repository coupled to the server such that the received identifier and the stored identifier are a same identifier, wherein the repository stores an association relating to the identifier and associating the identifier with the context information; and
  said server using the stored association to identify the context information stored in the consultant context.

8. The method of claim 7, wherein the association associates the identifier with the context information by comprising a pointer to the context information.

9. The method of claim 7, said method comprising:
  after said server storing the received context information in the consultant context, said server receiving from the consultant browser a request for the identifier;
  said server generating the identifier in response to the received request;
  after said generating the identifier, said server generating the association;
  after said generating the association, said server storing the identifier and the association in the repository and providing the identifier to the consultant browser; and
  after said server providing the identifier to the consultant browser, said server receiving the identifier from the user browser after the consultant browser provided the identifier to the second user and after the second user provided the identifier to the first user and after the first user provided the identifier to the user browser.

10. The method of claim 6, wherein the identifier is not a Universal Resource Locator (URL).

11. A computer program product, comprising a non-transitory computer readable tangible storage device having computer readable program code stored therein, said program code configured to be executed by a processor of a data processing system to implement a method of assisted browser navigation, said method comprising:
  a server creating a user context that reflects a context of a first session between a user browser and the server, said user context being within the server;
  said server creating a consultant context that reflects a context of a second session between a consultant browser and the server, said consultant context being within the server, said user browser and said consultant browser being different browsers, said first session and said second session being different sessions;
  said server storing context information in the consultant context after the context information was received by the server from the consultant browser after a first user at the user browser identified, to a second user at the consultant browser, information that the first user desires to obtain and after the first user has requested that the second user assist the first user in obtaining access to the desired information and after the second user navigated to the desired information using the consultant browser, said context information identifying an access to the desired information;
  after said server storing the received context information in the consultant context, said server receiving from the user browser an identifier of the context information stored in the consultant context, said identifier having been established at a time when the desired information is needed rather than having been established statically;
  said server using the received identifier to identify the context information stored in the consultant context; and
  said server storing the identified context information in the user context, wherein the server is configured to transmit the context information in the user context to the user browser for enabling the user to access, via the user browser, the desired information.

12. The computer program product of claim 11, wherein said server using the received identifier comprises:
  said server matching the received identifier to an identifier stored in a repository coupled to the server such that the received identifier and the stored identifier are a same identifier, wherein the repository stores an association relating to the identifier and associating the identifier with the context information; and
  said server using the stored association to identify the context information stored in the consultant context.

13. The computer program product of claim 12, wherein the association associates the identifier with the context information by comprising a pointer to the context information.

14. The computer program product of claim 12, said method comprising:
  after said server storing the received context information in the consultant context, said server receiving from the consultant browser a request for the identifier;
  said server generating the identifier in response to the received request;
  after said generating the identifier, said server generating the association;
  after said generating the association, said server storing the identifier and the association in the repository and providing the identifier to the consultant browser; and
  after said server providing the identifier to the consultant browser, said server receiving the identifier from the user browser after the consultant browser provided the identifier to the second user and after the second user provided the identifier to the first user and after the first user provided the identifier to the user browser.

15. The computer program product of claim 11, wherein the identifier is not a Universal Resource Locator (URL).

16. A data processing system comprising a processor, a memory coupled to the processor, and a computer readable tangible storage device coupled to the processor, said storage device containing program code configured to be executed by the processor via the memory to implement a method of assisted browser navigation, said method comprising:
  a server creating a user context that reflects a context of a first session between a user browser and the server, said user context being within the server;
  said server creating a consultant context that reflects a context of a second session between a consultant browser and the server, said consultant context being within the server, said user browser and said consultant browser being different browsers, said first session and said second session being different sessions;
  said server storing context information in the consultant context after the context information was received by the server from the consultant browser after a first user at the user browser identified, to a second user at the consultant browser, information that the first user desires to obtain and after the first user has requested that the second user assist the first user in obtaining access to the desired information and after the second user navigated to the desired information using the consultant browser, said context information identifying an access to the desired information;
  after said server storing the received context information in the consultant context, said server receiving from the user browser an identifier of the context information stored in the consultant context, said identifier having been established at a time when the desired information is needed rather than having been established statically;

said server using the received identifier to identify the context information stored in the consultant context; and said server storing the identified context information in the user context, wherein the server is configured to transmit the context information in the user context to the user browser for enabling the user to access, via the user browser, the desired information.

17. The data processing system of claim 16, wherein said server using the received identifier comprises:

said server matching the received identifier to an identifier stored in a repository coupled to the server such that the received identifier and the stored identifier are a same identifier, wherein the repository stores an association relating to the identifier and associating the identifier with the context information; and said server using the stored association to identify the context information stored in the consultant context.

18. The data processing system of claim 17, wherein the association associates the identifier with the context information by comprising a pointer to the context information.

19. The data processing system of claim 17, said method comprising:

after said server storing the received context information in the consultant context, said server receiving from the consultant browser a request for the identifier;

said server generating the identifier in response to the received request;

after said generating the identifier, said server generating the association;

after said generating the association, said server storing the identifier and the association in the repository and providing the identifier to the consultant browser; and after said server providing the identifier to the consultant browser, said server receiving the identifier from the user browser after the consultant browser provided the identifier to the second user and after the second user provided the identifier to the first user and after the first user provided the identifier to the user browser.

20. The data processing system of claim 16, wherein the identifier is not a Universal Resource Locator (URL).

* * * * *